May 7, 1963
R. F. McINTOSH
3,088,757
CONDUIT CONNECTOR
Filed Dec. 30, 1959
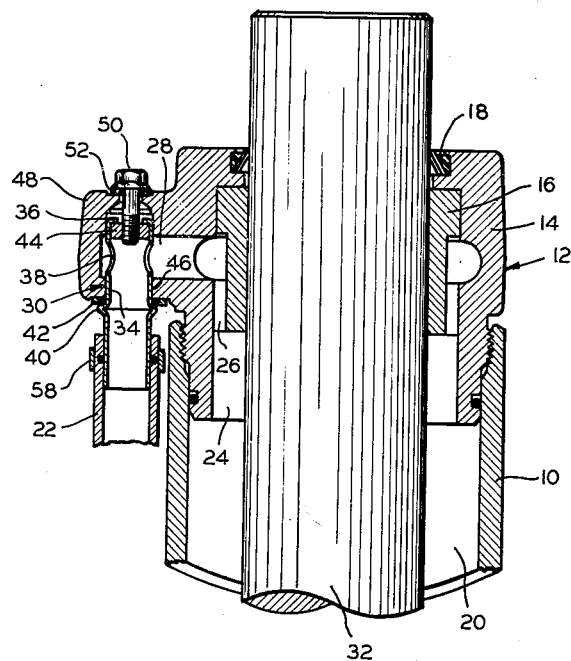
INVENTOR.
RICHARD F. McINTOSH
BY
ATTORNEY

United States Patent Office 3,088,757
Patented May 7, 1963

3,088,757
CONDUIT CONNECTOR
Richard F. McIntosh, Battle Creek, Mich., assignor to Clark Equipment Company, a corporation of Michigan
Filed Dec. 30, 1959, Ser. No. 862,969
1 Claim. (Cl. 285—158)

This invention relates to improvements in conduit connectors suitable for use with power cylinders and the like.

It is the object of the invention to provide an improved, simple, and relatively inexpensive conduit connector.

The single FIGURE is a partial view in longitudinal section of my improved conduit connector in combination with the gland end of a fluid pressure actuated cylinder and piston assembly.

Referring now to the drawing, there is illustrated in cross-section my conduit connector in association with the gland end 12 of a single-acting power cylinder 10. The gland end 12 comprises a cylinder cap 14 of known construction including an annular piston rod bearing and guide element 16 and a piston rod seal 18. Cylinder chamber 20 is on the low pressure side of a piston head, not shown, and is adapted to communicate with a vent conduit 22 by way of passages 24, 26 and 28, and a connector assembly 30.

The connector assembly 30 comprises a generally tubular metal connecting element 34 preferably formed in a stamping operation; it includes an inwardly extending flange 36 at the upper end thereof, circumferential ports 38 a short distance below the flange 36 in communication with passage 28, and an outwardly extending annular projection 40 formed to engage a sealing washer 42 intermediate the projection 40 and the lower surface of a radially extending cylinder cap projection 48. A threaded plug 44 is contained within the upper end of the connector assembly intermediate the flange 36 and ports 38.

The connector 30 is assembled with the cylinder cap 14 merely by forcibly inserting it upwardly, as by a stab fitting, through a vertical opening 46 provided in projection 48 which intersects passage 28 thereof, and then engaging plug 44 with a short bolt 50 which extends downwardly through an upper opening which comprises an extension of opening 46 in projection 48. It will be noted that my conduit connector, as shown in association with a power cylinder, is located in such close parallel proximity to the wall of the cylinder that during assembly of conduit 22 thereon the use of tools between the walls of the cylinder and conduit is substantially prevented. My invention provides a very compact cylinder connector construction which may be easily assembled with and disassembled from the cylinder. A sealing washer 52 is provided between bolt 50 and the upper surface of projection 48. Tightening of the bolt 50 causes the conduit connector 30 to be drawn into secure association with projection 48 and effects a seal at sealing washers 42 and 52. Conduit 22 is secured at the lower end of connector 30 by means of a clamp member 58.

Thus, the upper end of cylinder 10 may be vented to a sump or other means by way of a connector assembly which is extremely simple and inexpensive in construction and which may be readily associated in sealing relation with cylinders and the like.

While I have shown and described what I believe to be a preferred embodiment of the present invention, it will be understood that modifications may be made in the construction without departing from the scope of my invention.

I claim:

A conduit connector assembly for use with fluid conducting cylinders comprising a cylinder cap mounted on one end of the cylinder and having a projection extending radially outwardly of the wall of the cylinder, an opening extending through said projection in a direction generally parallel to the cylinder axis and in relatively close proximity to the outer wall of the cylinder, connector means adapted to be stab fitted into said opening, a conduit means adapted to be coaxially secured to said connector means, said connector means and conduit means being of considerably smaller diameter than the diameter of said cylinder, said connector means when connected into said opening being in such close proximity to said cylinder as to substantially prevent the use of tools intermediate the cylinder wall and the conduit means to assemble the conduit means to the connector means, said connector means including an elongated tubular member having a port adjacent one end thereof, an inwardly extending flange at the one end thereof forming a chamber, a threaded plug in said chamber and a circumferentially extending projection intermediate the ends of the connector and adapted to engage one side of said projection on said cylinder cap adjacent said opening in sealing relation thereto, holding means equipped with sealing means extending through the opposite side of said projection on said cylinder cap and into said one end of the connector means for threadedly engaging said plug whereby to hold the connector in fixed relation to said projection on said cylinder cap, and a second opening in said projection on said cylinder cap which intersects said first opening intermediate the ends thereof and which is adapted to communicate a chamber in the cylinder with said port and connector means, said connector means being disposed in sealing relation with the radial projection of the cylinder cap upon tightening movement of the holding means in said plug.

References Cited in the file of this patent
UNITED STATES PATENTS

| 355,137 | Bushnell | Dec. 28, 1886 |
| 673,280 | Moran | Apr. 30, 1901 |
| 773,106 | Stier | Oct. 25, 1904 |
| 949,108 | Abel | Feb. 15, 1910 |
| 2,070,805 | Peterson | Feb. 16, 1937 |